(12) United States Patent
Inoue

(10) Patent No.: US 7,812,474 B2
(45) Date of Patent: Oct. 12, 2010

(54) AUTOMOBILE

(75) Inventor: Makoto Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 316 days.

(21) Appl. No.: 12/160,228

(22) PCT Filed: Jan. 16, 2007

(86) PCT No.: PCT/JP2007/050456

§ 371 (c)(1),
(2), (4) Date: Jul. 8, 2008

(87) PCT Pub. No.: WO2007/086271

PCT Pub. Date: Aug. 2, 2007

(65) Prior Publication Data

US 2009/0085401 A1 Apr. 2, 2009

(30) Foreign Application Priority Data

Jan. 27, 2006 (JP) ............................. 2006-018804
Feb. 23, 2006 (JP) ............................. 2006-046551

(51) Int. Cl.
*H02H 7/18* (2006.01)
(52) U.S. Cl. ..................................................... 307/10.7

(58) Field of Classification Search ................. 307/10.7
See application file for complete search history.

(56) References Cited

FOREIGN PATENT DOCUMENTS

| JP | 05-116571 | 5/1993 |
|---|---|---|
| JP | 09-275635 | 10/1997 |
| JP | 2000-183782 | 6/2000 |
| JP | 2000-299922 | 10/2000 |
| JP | 2002-067882 | 3/2002 |
| JP | 2005-028908 | 2/2005 |

OTHER PUBLICATIONS

International Search Report Dated Apr. 10, 2007.

*Primary Examiner*—Jared J Fureman
*Assistant Examiner*—Dru M Parries
(74) *Attorney, Agent, or Firm*—Pearne & Gordon LLP

(57) ABSTRACT

The automobile of the present invention is provided with a capacitor for backup use in case of disconnection or breakdown of a battery. When a start switch is turned on, the collected charge in the capacitor is supplied to a device in which a large current is flowing, such as discharging resistor, motor or lamp, or a device in which a small current is flowing, such as dark current consuming device, and therefore, after the start switch is turned off, power consumption of the battery can be suppressed.

11 Claims, 2 Drawing Sheets

AUTOMOBILE

TECHNICAL FIELD

The present invention relates to an automobile, more particularly to a power source control unit thereof.

BACKGROUND ART

Hybrid cars and electric vehicles are rapidly developed recently. In this background, in the field of braking of automobiles, there is a rapid change from mechanical braking to electrical braking.

Generally, to brake an automobile, a battery is used power source for hydraulic valve driving to control braking. If the battery is disconnected or broken by some cause or other, electric power is not supplied from the battery, and the vehicle cannot be braked or controlled. In case of such emergency, a small battery is often prepared as auxiliary power source. The battery, if small in size, is heavy, and a power source backup device using capacitor instead of battery is proposed in patent document 1.

However, if a small battery or a capacitor is used as auxiliary power source, when the start switch is turned off, due to motors or lamps mounted on the vehicle or dark current consuming devices such as automatic unlocking device (keyless entry system), the electric power of the battery is consumed. As a result, the battery voltage is lowered, and various problems come out.

[Patent document 1] Unexamined Japanese Patent Publication No. H5-116571

DISCLOSURE OF THE INVENTION

The automobile of the present invention has a capacitor charged while the start switch is being turned on, and a detector for detecting the status of use of motor or lamp. When the start switch is turned off, the collected charge in the capacitor is supplied into the dark current consuming devices, and depending on the status of use of the motor or lamp detected by the detector, the collected charge in the capacitor is supplied at least to one of the discharge resistance, motor and lamp.

In such configuration, if the battery is disconnected or broke, the capacitor is used for backup. After the start switch is turned off, the collected charge in the capacitor is supplied to the dark current consuming devices, and also to the discharge resistance, motor or lamp, so that the power consumption of the battery can be suppressed.

DESCRIPTION OF REFERENCE NUMERALS

Figure 1:
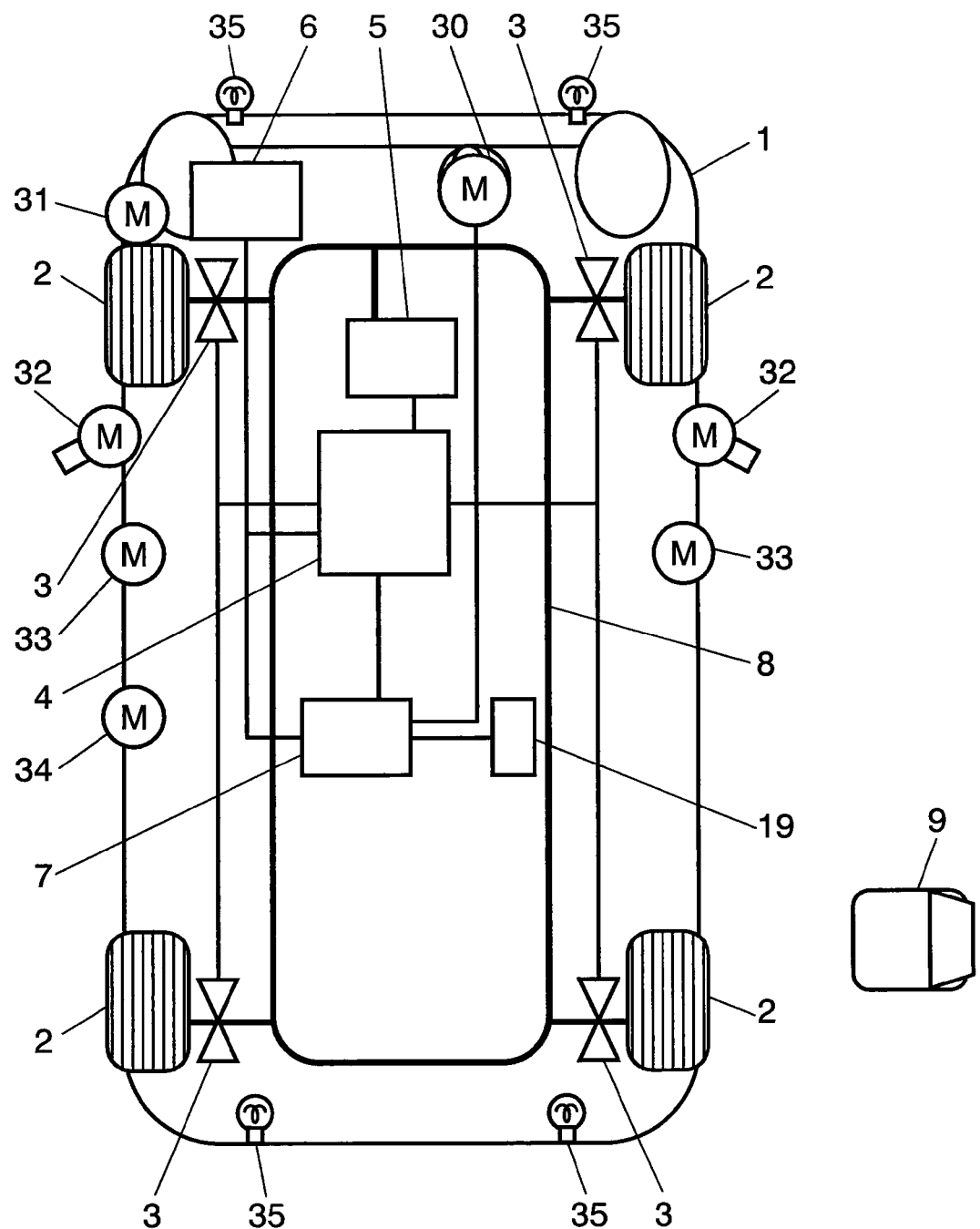
FIG. 1 is a conceptual diagram explaining the mechanism of a system including a power source device of an automobile in preferred embodiment 1 of the present invention.

4 Brake device
6 Battery
7 Power source device
9 Electronic key
10 Start switch
11 Engine (drive unit)
12 Voltage monitor
13 Charging circuit
14 Capacitor
15 Backup detector
16 Power supply unit
18 Discharging circuit
19 Automatic unlocking device (dark current consuming device)
20 Antenna
21 Signal receiving circuit
22 Locking device
23 Voltage converter
29 Detector
30 Radiator cooling fan motor
31 Antenna retracting motor
32 Door mirror retracting motor
33, 34 Window opening motor
35 Hazard lamp
183 Discharge resistance

BEST MODE FOR CARRYING OUT THE INVENTION

A preferred embodiment of the present invention is described below while referring to the accompanying drawings.

Preferred Embodiment 1

Figure 2:
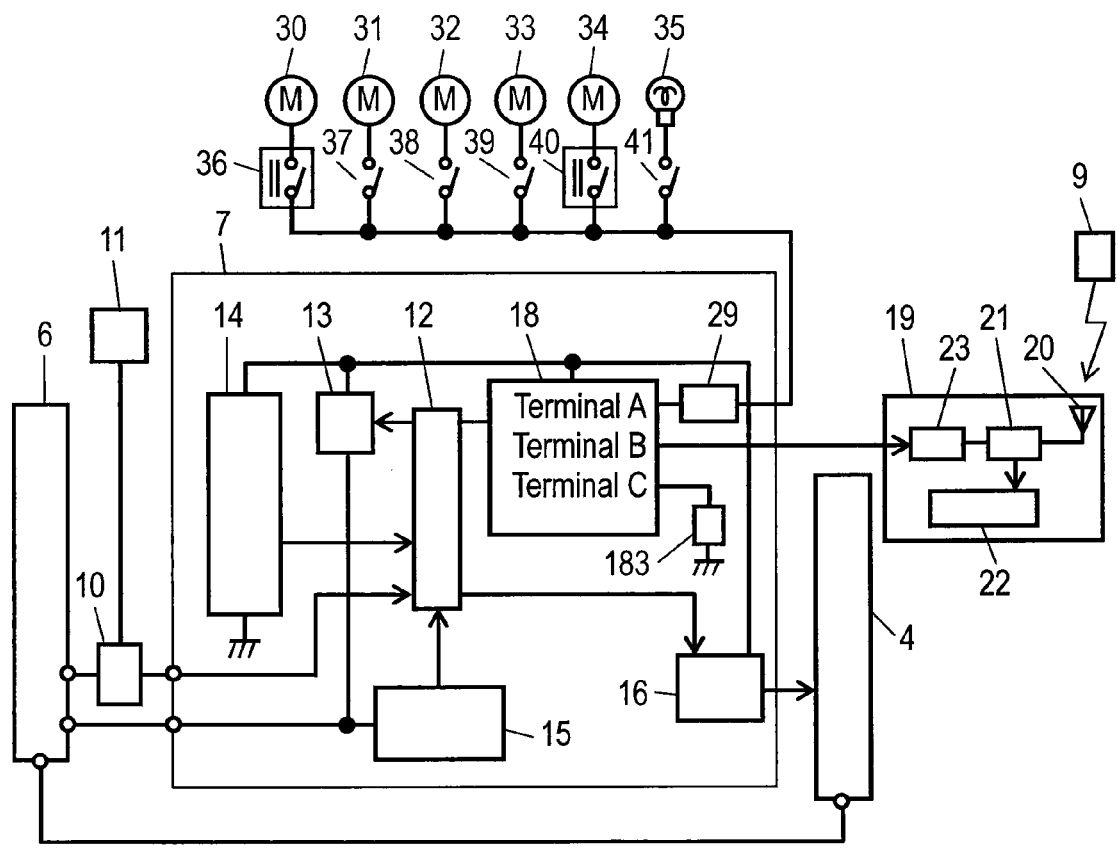
FIG. 2 is a block diagram explaining the power source control of an automobile in preferred embodiment 1 of the present invention.

FIG. 1 is a conceptual diagram explaining the mechanism of a system including power source device 7 of an automobile in preferred embodiment 1 of the present invention, and FIG. 2 is a block diagram explaining the power source control of an automobile in preferred embodiment 1 of the present invention. As shown in FIG. 1, the main body of automobile 1 is supported by four wheels 2. Each one of four wheels 2 is provided with a hydraulic brake device (not shown), or a brake. The brake is a device operating by making use of oil pressure. The oil pressure in hydraulic pipe 8 is raised by hydraulic pump 5, and the oil pressure is transmitted up to the brake device (brake) by way of hydraulic pipe 8. The brake force is adjusted by the opening degree of hydraulic valve 3 provided before the brake device connected to each one of wheels 2.

Specifically, when the driver slows down or stops automobile 1, the brake pedal (not shown) is stepped down. This stepping stroke is detected by brake device 4, and the opening degree of hydraulic valve 3 is adjusted depending on the stepping stroke of the brake pedal by way of hydraulic pipe 8. As a result, four wheels 2 are braked appropriately.

All energy for adjusting the opening degree of hydraulic valve 3 is usually supplied from battery 6. Therefore, if battery 6 is disconnected or broken due to some cause or other, brake device 4 does not operate. As a result, hydraulic valve 3 does not operate, and braking fails.

To avoid such circumstance, in preferred embodiment 1, power source device 7 is newly installed, and power source device 7 backs up battery 6 if power is not supplied from battery 6.

This power source device 7 may be realized by a small-sized lead storage battery same as battery 6 used as main power source, but it is heavy. In preferred embodiment 1, therefore, power source device 7 is composed by using capacitor 14 shown in FIG. 2.

The construction of power source device 7 is explained by referring to FIG. 2. As shown in FIG. 2, power source device 7 is connected to battery 6 by way of start switch 10, which is an ignition switch. Engine (drive unit) 11 is also connected to battery 6 to which starting energy is supplied, by way of start switch 10. Herein, power source device 7 is a power source supply unit for power source backup, and includes capacitor 14 to be charged when start switch 10 is turned on, and charging circuit 13 connected to battery 6 for charging capacitor 14. Further, power source device 7 includes backup detector 15 connected to battery 6 for detecting abnormality of supply voltage from battery 6, and voltage monitor 12 connected to start switch 10 for detecting on/off status of start switch 10 and monitoring the voltage of capacitor 14. Voltage monitor 12 is connected to charging circuit 13 for charging capacitor 14 by supplying the electric power of battery 6.

Moreover, power source device 7 is provided with various devices by way of switches 36 to 41, such as radiator cooling fan motor 30, antenna retracting motor 31, door mirror retracting motor 32, window opening motors 33, 34, and hazard lamp 35. Power source device 7 further includes discharging circuit 18, and detector 29 connected to capacitor 14 of power source device 7 by way of discharging circuit 18, for detecting the status of use of these motors and lamp. Brake device 4 for braking the automobile is connected to battery 6, and is also connected to capacitor 14 by way of voltage monitor 12 and power supply unit 16, and the collected charge is supplied.

Discharging circuit 18 has three terminals A, B, C. Switches 36 to 41 are connected to terminal A of discharging circuit 18 by way of detector 29. Automatic unlocking device 19 and other dark current consuming devices are connected to terminal B of discharging circuit 18. Dark current consuming devices are devices in which a small current is flowing, such as automatic unlocking device 19. Discharge resistance 183 is connected to terminal C of discharging circuit 18 for discharging the collected charge of capacitor 14 when start switch 10 is turned off.

Automatic unlocking device 19 is provided with voltage converter 23 connected to terminal B of discharging circuit 18 for converting the voltage of the supplied power source, signal receiving circuit 21 connected to voltage converter 23 for receiving a communication signal from electronic key 9 on antenna 20 and processing, and locking device 22 for instructing locking or unlocking by receiving a signal from signal receiving circuit 21.

When start switch 10 is turned on, the operation of power source device 7 of the automobile is as follows. That is, when start switch 10 is turned on, engine (drive unit) 11 is started. As a result, by using the output of engine 11, power generation by power generator (not shown) is started. Consequently, the power generator starts charging of battery 6. At the same time, voltage monitor 12 detects when start switch 10 is turned on, and charging of capacitor 14 is started toward the voltage (about 12 V) of battery 6 by way of charging circuit 13.

In ordinary state, the driving energy to hydraulic valve 3 is supplied from battery 6. But when battery 6 is disconnected due to certain cause, or when battery 6 is broken and abnormal, backup detector 15 detects abnormality of supply voltage from battery 6. In such abnormal state, the collected charge in capacitor 14 is supplied to brake device 4 by way of power supply unit 16. Thus, the brake device (brake) is active for a specific time.

Next, in operation in ordinary state, the operation of power source device 7 of the automobile when start switch 10 is turned off is explained. When start switch 10 is turned off, power generation by engine 11 and power generator is stopped. As a result, charging to battery 6 and capacitor 14 in power supply device 7 is stopped. At the same time, voltage monitor 12 detects when start switch 10 is turned off. To prevent deterioration of capacitor 14, the collected charge in capacitor 14 as power source supply unit for power source backup begins to be discharged into discharge resistance 183 by way of terminal C of discharging circuit 18.

Figure 3:
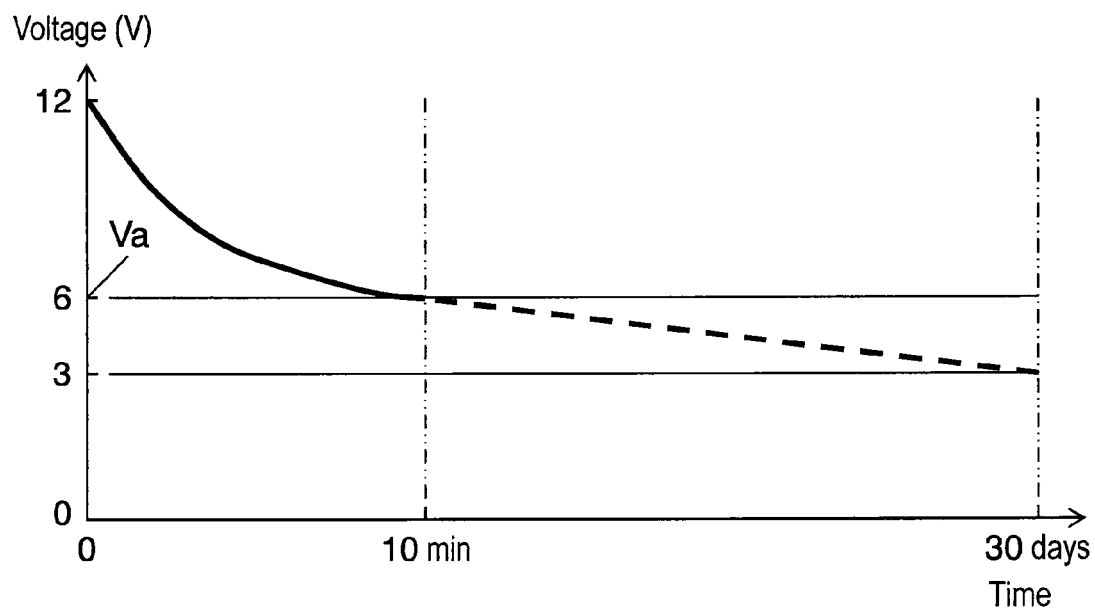
FIG. 3 is a characteristic diagram of voltage changes of capacitor of an automobile in preferred embodiment 1 of the present invention.

FIG. 3 is a characteristic diagram of voltage changes of capacitor 14 of an automobile in preferred embodiment 1 of the present invention. In FIG. 3, the axis of ordinates denotes the voltage of capacitor 14, and the axis of abscissas represents the time. As shown in the diagram, it takes about 10 minutes in preferred embodiment 1 until the voltage of capacitor 14 charged to about 12 V is lowered to a specified voltage of Va (6 V) by discharge of collected charge.

In the duration of 10 minutes until the collected charge in capacitor 14 is discharged by discharge resistance 183 after start switch 10 is turned off, or before start switch 10 is turned off, if any one of radiator cooling fan motor 30, antenna retracting motor 31, door mirror retracting motor 32, window opening motors 33, 34, and hazard lamp 35 for example shown in FIG. 2 has been used, that is, if any one of switches 36 to 41 in FIG. 2 has been turned on, the current flowing from terminal A of discharging circuit 18 to at least one of switches 36 to 41 is detected by detector 29. As a result, discharging of collected charge in capacitor 14 is stopped from terminal C of discharging circuit 18.

In this manner, the collected charge in capacitor 14 is supplied in at least one of radiator cooling fan motor 30, antenna retracting motor 31, door mirror retracting motor 32, window opening motors 33, 34, and hazard lamp 35. At the same time, discharging of collected charge in capacitor 14 by discharging resistor 183 through terminal C of discharging circuit 18 is interrupted.

Thus, the automobile of the present invention is configured so that the collected charge in capacitor 14 may be supplied into automatic unlocking device 19 or dark current consuming device when start switch 10 is turned off, and that, depending on the status of the motor or lamp detected by detector 29, that the collected charge in capacitor 14 may be supplied to at least one of discharging resistor 183, motor, and lamp. Herein, the motor is at least one of radiator cooling fan motor 30, antenna retracting motor 31, door mirror retracting motor 32, and window opening motors 33, 34, and the lamp is, for example, hazard lamp 35.

For driving radiator cooling fan motor 30, antenna retracting motor 31, door mirror retracting motor 32, window opening motors 33, 34, and hazard lamp 35, meanwhile, a voltage of 6 V or more is needed. Therefore, up to the specified voltage shown in FIG. 3, that is, Va (6 V), these devices are driven by the collected charge in capacitor 14, but thereafter they are driven intermittently by the electric power of battery 6. That is, when voltage monitor 12 judges that the voltage of capacitor 14 is lower than the specified voltage Va (6 V), the electric power of battery 6 is supplied from terminal A of discharging circuit 18. The collected charge in capacitor 14 is supplied only from terminal B of discharging circuit 18, and the supply from terminal C is stopped. That is, the collected charge in capacitor 14 is supply only to the automatic unlocking device 19 or the dark current consuming device. Supply of collected charge in capacitor 14 to discharging resistor 183 or motor or lamp is stopped.

The operation of automatic unlocking device 19 or dark current consuming device is explained. The collected charge in capacitor 14 is supplied to automatic unlocking device 19 at voltage converter 23 through terminal B of discharging circuit 18 while start switch 10 is turned off. Voltage converter 23 supplies an electric power to signal receiving circuit 21 at a specified voltage. A communication signal from electronic key 9 is received by antenna 20, and signal receiving circuit 21 instructs locking or unlocking operation to locking device 22. Thus, according to the user' operation from electronic key 9, the key is locked or unlocked.

The dark current consuming device such as automatic unlocking device 19 is a device in which a small current flows. Therefore, if the collected charge in capacitor 14 is consumed by the dark current consuming device alone, it takes a very long time until the voltage of capacitor 14 is lowered. As a result, capacitor 14 is kept at high voltage, and hence deteriorates.

In preferred embodiment 1, voltage monitor 12 detects when start switch 10 is turned off, and the collected charge in capacitor 14 is consumed by the devices consuming large currents, such as radiator cooling fan motor 30, antenna retracting motor 31, door mirror retracting motor 32, window opening motors 33, 34, and hazard lamp 35 through discharging circuit 18. As a result, as shown in FIG. 3, the voltage in capacitor 14 is lowered to 6 V, about half of nominal voltage 12 V of battery 6 in about 10 minutes. Capacitor 14 in preferred embodiment 1 is composed of six capacitors of withstand voltage of 2 V connected in series, and voltage of no effect on the life of each capacitor of withstand voltage of 2 V is 1 V per capacitor. Therefore, when the voltage of capacitor 14 is lowered to 6 V or less, deterioration due to continued high voltage state of capacitor 14 can be prevented.

As described herein, according to preferred embodiment 1, when voltage monitor 12 judges that the voltage of capacitor 14 is smaller than specified voltage Va (6 V), the collected charge of capacitor 14 is supplied only from terminal B of discharging circuit, and supply from terminal C is stopped. From terminal A, the electric power of battery 6 is supplied. Thus, the collected charge in capacitor 14 is supplied only to voltage converter 23 of automatic unlocking device 19 which is a dark current consuming device communicating with the electronic key. Hence, automatic unlocking device 19 may wait for unlocking and locking operation for a long period. At the same time, deterioration due to continued high voltage of capacitor 14 can be prevented.

When the dark current consuming device is automatic unlocking device 19, the receiving voltage by capacitor 14 is 3 V. Therefore, as shown in FIG. 3, the holding period of receiving voltage by capacitor 14 is 30 days or more, and a holding period of safe level is assured.

Also as shown in FIG. 1 to FIG. 3, in preferred embodiment 1, automatic unlocking device 19 for communicating with electronic key 9 is used as dark current consuming device, but other devices may be also used, such as anti-theft device, clock, information storage device of acoustic appliance, or communication device for sending and receiving position information.

When start switch 10 is turned off, and the voltage of capacitor 14 is somewhere between 12 V and 6 V, the collected charge in capacitor 14 can be supplied to voltage converter 23 of automatic unlocking device 19 by way of terminal B of discharging circuit 18, thereby waiting for unlocking or locking operation, so that the power consumption of battery 6 can be suppressed.

INDUSTRIAL APPLICABILITY

As described herein, the present invention is provided with a capacitor for backup use in case of disconnection or breakdown of battery, and when the start switch is turned off, the voltage of the capacitor is supplied to the radiator cooling fan motor, antenna retracting motor, door mirror retracting motor, window opening motors, or hazard lamp in which a large current is flowing, or to dark current consuming device in which a small current is flowing. Therefore, after the start switch is turned off, the battery power consumption is suppressed or stopped, and decline of battery voltage is suppressed, which is very useful for power source control of an automobile.

The invention claimed is:

1. An automobile comprising:
   a drive unit for driving force;
   a battery for supplying starting energy to the drive unit;
   a start switch for supplying the starting energy to the drive unit from the battery;
   a capacitor to be charged when the start switch is turned on;
   a brake device for receiving a supply of collected charge from the capacitor;
   a discharging resistor for discharging the collected charge in the capacitor when the start switch is turned off, and
   a detector for detecting a status of use of a motor or a lamp,
   wherein when the start switch is turned off,
   the collected charge in the capacitor is supplied to a dark current consuming device, and
   the collected charge in the capacitor is discharged to the discharging resistor, and
   when the detector detects the status of use of at least one of the motor and the lamp,
   the collected charge in the capacitor is suspended from being discharged to the discharging resistor, and is supplied to at least one of the motor and the lamp.

2. The automobile of claim 1, wherein the motor is a motor for a cooling fan.

3. The automobile of claim 1, wherein the motor is a motor for retracting a door mirror.

4. The automobile of claim 1, wherein the motor is a motor for retracting an antenna.

5. The automobile of claim 1, wherein the motor is a motor for opening and closing a window.

6. The automobile of claim 1, wherein the lamp is a hazard lamp.

7. The automobile of claim 1, wherein the dark current consuming device is an automatic unlocking device for communicating with an electronic key.

8. The automobile of claim 1, wherein the dark current consuming device is an anti-theft device.

9. The automobile of claim 1, wherein the dark current consuming device is a clock.

10. The automobile of claim 1, wherein the dark current consuming device is an information storage device of an acoustic appliance.

11. An automobile comprising:
    a drive unit for motive power;
    a battery for supplying starting energy to the drive unit;
    a start switch for supplying the starting energy to the drive unit from the battery;
    a capacitor to be charged when the start switch is turned on;
    a brake device for receiving a supply of collected charge from the capacitor;
    a discharging resistor for discharging the collected charge in the capacitor when the start switch is turned off,
    a detector for detecting a status of use of a motor or a lamp, and
    a voltage monitor for monitoring a voltage of the capacitor,
    wherein when the start switch is turned off, the collected charge in the capacitor is supplied to a dark current consuming device, depending on the status of use of the motor or the lamp detected by the detector, the collected charge in the capacitor is supplied to at least one of the discharging resistor, the motor and the lamp, and when the voltage monitor judges that the voltage of the capacitor is lower than a specified voltage, the collected charge in the capacitor is supplied only to the dark current consuming device, and supply to the discharging resistor, the motor, or the lamp is stopped.

* * * * *